Aug. 19, 1952 E. M. PURCELL ET AL 2,607,849
CONTROL OF POLARIZATION IN WAVE GUIDES AND WAVE GUIDE SYSTEMS
Filed Oct. 2, 1943 2 SHEETS—SHEET 1
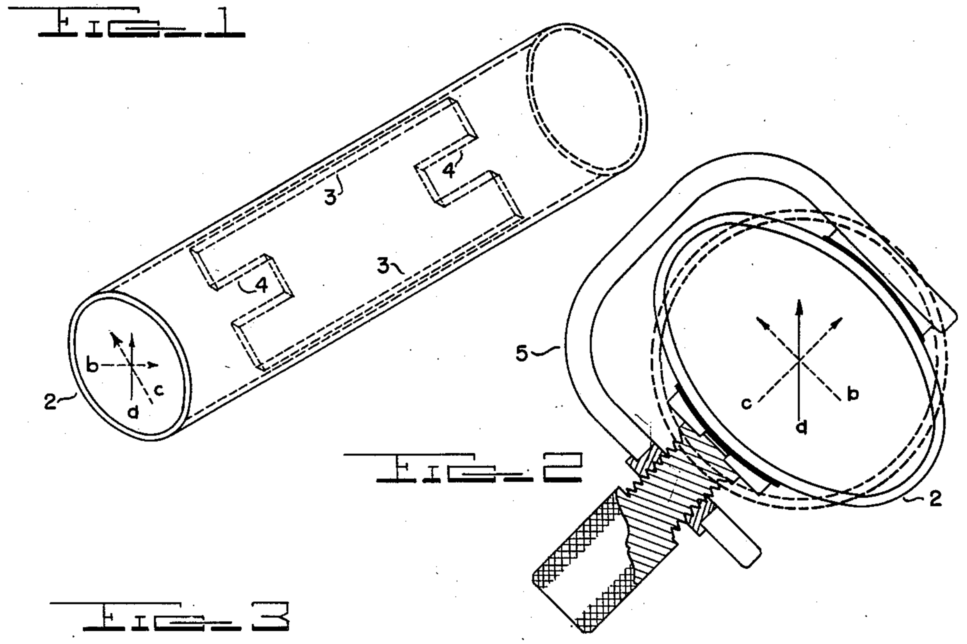
FIG. 1, FIG. 2
FIG. 3
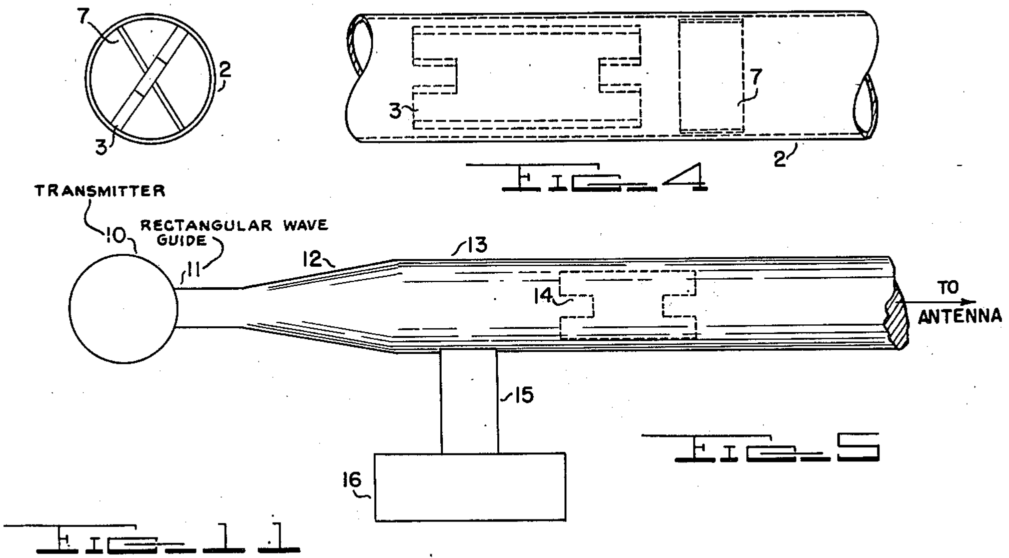
FIG. 4, FIG. 5
FIG. 11
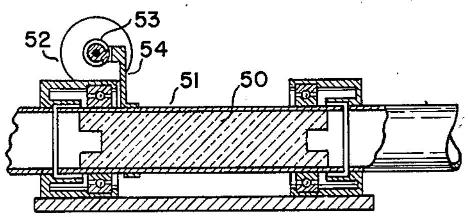
Inventors
CAROL G. MONTGOMERY
DOROTHY D. MONTGOMERY
EDWARD M. PURCELL
By [signature]
Attorney Aug. 19, 1952

E. M. PURCELL ET AL

CONTROL OF POLARIZATION IN WAVE GUIDES AND WAVE GUIDE SYSTEMS 2,607,849

Filed Oct. 2, 1943

2 SHEETS—SHEET 2

Inventors

CAROL G. MONTGOMERY

DOROTHY D. MONTGOMERY

EDWARD M. PURCELL

By [signature]

Attorney

Patented Aug. 19, 1952

2,607,849

UNITED STATES PATENT OFFICE 2,607,849

CONTROL OF POLARIZATION IN WAVE GUIDES AND WAVE GUIDE SYSTEMS

Edward M. Purcell, Cambridge, Mass., and Carol G. Montgomery and Dorothy Durfee Montgomery, New Haven, Conn., assignors, by mesne assignments, to the United States of America as represented by the Secretary of the Navy Application October 2, 1943, Serial No. 504,776

12 Claims. (Cl. 178—44)

This invention relates to systems for transmitting and receiving high-frequency radio waves and in general to systems for conveying high-frequency oscillatory electric energy. In particular the invention relates to the control of the polarization of guided radio waves in apparatus for conveying such waves and to systems making special use of the control of the polarization of such waves for various useful purposes more particularly described below.

In the past some difficulty has been encountered in controlling the polarization of guided waves in high-frequency radio apparatus, particularly in cylindrical wave guides which because of their axial symmetry permit the plane of polarization of the wave guided therein to change during transmission. In such wave guides, bends in the wave guide systems which do not lie exactly in the plane of the electric vector or in a plane exactly perpendicular thereto tend to cause the polarization of the wave transmitted to become elliptic because of the different path lengths for different plane-polarized components of the wave.

We have found means for correcting ellipticity of polarization caused by bends in the wave guide system and for restoring plane polarization and we have further found that such means may be adapted to produce from a plane-polarized wave any desired degree of ellipticity of polarization and, in particular, circular polarization. We have further discovered that by organizing a system for sending out pulses of circularly polarized radiation and then receiving such pulses, it is possible to discriminate against the transmitted signals and in favor of the received signals at a suitably located junction of the apparatus, thus providing a new form of radio transmitting and receiving system employing a common radiator interceptor or antenna. We have further found that it is possible to combine polarization-controlling means in accordance with the present invention to provide phase shifters, rotating joints and other useful apparatus.

Among the objects of the present invention are the provision of means for controlling the polarization of waves in guided wave systems and for the organization of such polarization-controlling means for (1) effecting discrimination between a transmitted signal and a received signal in a radio transmitting and receiving system, (2) providing an adjustable phase shifter for plane or otherwise polarized waves, (3) providing a rotating joint for a wave guide system, (4) providing a transition between plane and circularly polarized waves, (5) providing adjustable control of the plane of polarization of a guided wave, and for other purposes.

The invention is illustrated in the annexed drawings, in which:

Fig. 1 is a perspective view, partly diagrammatic, showing means for providing a transition between plane and elliptically or circularly polarized waves in a cylindrical wave guide;

Fig. 2 shows, partly in cross section, another arrangement for producing interchange of energy between a plane-polarized wave and an elliptically or circularly polarized wave in a cylindrical wave guide;

Figs. 3 and 4 show, in cross section and in side elevation respectively, an arrangement similar to that of Fig. 1 which includes in addition a fine adjustment;

Fig. 5 is a plan, partly diagrammatic, of a system for radiating and receiving circularly polarized radiation as aforesaid;

Fig. 11 shows a form of apparatus according to the present invention for adjusting at will or for continually changing the plane of polarization of plane-polarized waves in a wave guide system.

Figures 6, 7, 8:
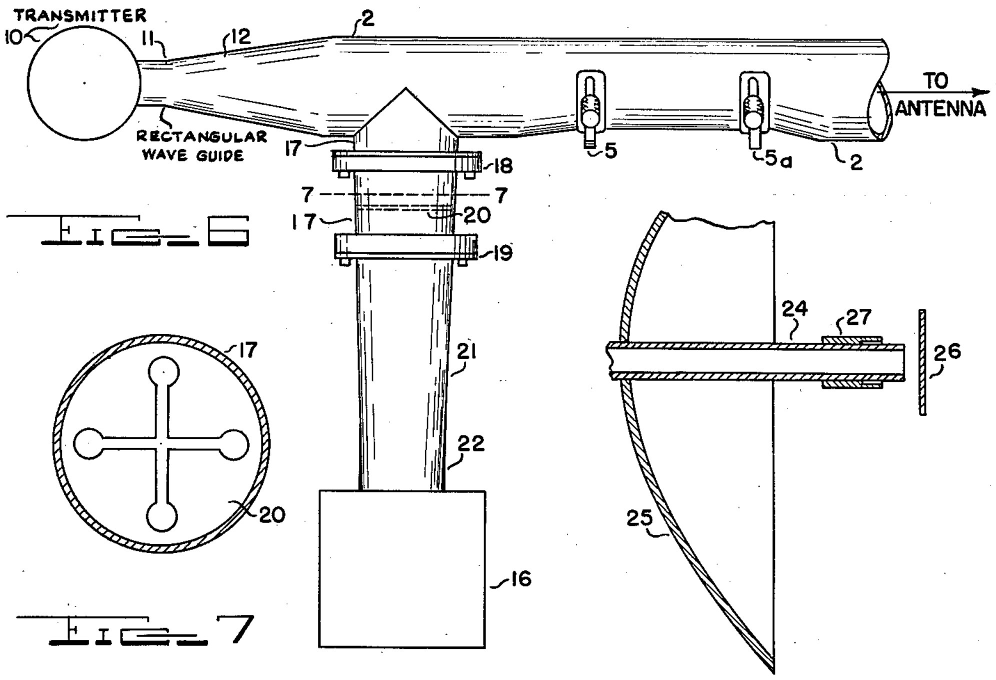
Fig. 6 is a plan view, also partly diagrammatic, showing another form of system of the same general type as that shown in Fig. 5.
Fig. 7 is a cross section along the line 7—7 of Fig. 6, looking downwards.
Fig. 8 shows in cross section a form of antenna or radiator-interceptor for sending and receiving circularly polarized radiation and adapted for use with apparatus of the type shown in Figs. 5 and 6.

There is shown in Fig. 1 a portion of a cylindrical wave guide form of a hollow cylindrical metallic pipe 2. Located within the pipe 2 is a slab or plate 3 of a solid dielectric material, preferably polystyrene. If it be now assumed that the incident wave transmitted in the wave guide 2 is so polarized that its electric vector corresponds with the direction of the arrow *a*, which is at an oblique angle with the plane parallel to the faces of the plate 3, it will be seen that the component waves having electric vectors oriented as indicated by the arrows *b* and *c* respectively, which are respectively in a plane parallel to the faces of the plate 3 and perpendicular to such plane, will be propagated with unequal velocity in that portion of the wave guide occupied by the plate 3. The difference in velocity arises from the fact that the plate 3 has relatively little effect upon an electric field directed perpendicularly to the surfaces of the plate whereas it has a relatively large effect upon an alternating electric field in which the electric vector lies in a plane parallel to the surfaces of the plate 3. It should be pointed out here that the waves in the guide 2 are of the $H_1$ mode, sometimes referred to as the $TE_{0,1}$ mode. Waves in this mode may be transmitted with plane, elliptical or circular polarization. The effect of the plate 3 may be further understood when it is considered that with respect to the component of the incident waves polarized in the direction *c*, the plate lies entirely within the region of maximum electric field and therefore exerts a relatively large shortening effect upon the wave length of the said component in the wave guide, whereas with respect to the component oriented in the direction *b*, only a small portion of the plate 3 lies in the region of the maximum electric field strength, so that only a relatively small shortening effect upon the wave length of the said component in the wave guide results.

As a result of the axial asymmetry of the plate 3 the components *b* and *c* of the incident radiation polarized in the direction *a* (referring in the direction of the electric vector as the direction of polarization, as is common in the electrical art, as is distinguished from the optical art, in which the direction of the magnetic vector is referred to as defining the plane of polarization) progressively fall out of phase as the wave is propagated along that portion of the wave guide occupied by the plate 3. The relative magnitude of the component in the direction of the plate 3 and perpendicular thereto is determined by the angle between the plate 3 and the plane of polarization of the incident wave, whereas the relative phase shift between the components produced by the plate 3 is determined by the axial length of the plate 3 (assuming that the other dimensions are uniform). If the length of the plate 3 is so chosen that a 90° phase shift is produced, the incident wave will be entirely transformed into an elliptically polarized wave, which in the case that the angle between the polarization of the incident wave and the direction of the plate 3 is 45°, will be a circularly polarized wave. The foregoing statement takes no account of losses in the dielectric 3, the assumption that these losses are negligible being safe in the case of polystyrene and other low loss dielectrics. In order to produce circular polarization with a dielectric such that some account must be taken of losses, the desired angle of the plate 3 to the plane of polarization of the incident wave may be adjusted to compensate for unequal attenuation of the components *b* and *c* so that after passing beyond the plate 3 these two components may have essentially equal amplitudes.

The discontinuity in the characteristics of the wave guide 2 produced at the transverse edges of the plate 3 would, if the plate 3 were provided in a simple rectangular shape, tend to cause reflection in the wave guide 2 thus setting up standing waves and reducing the amount of energy transmitted past the plate 3. In order to reduce these reflections and to improve the efficiency of power transfer, the transverse edges of the plate 3 are provided with notches 4 so that the transition between the empty guide 2 and the guide completely spanned by the plate 3 may be made in two steps of substantially equal relative magnitude separated approximately by a quarter-wave length so that the reflections from each of these steps may be of equal magnitude but opposite in phase. The calculation of the proper width and depth of the notches 4 is complicated by the fact that the quarter-wave length differs for the components polarized respectively in the directions *b* and *c*, but the difference is small enough so that a good approximation may be obtained without exact calculations, and the first approximation of the dimensions of the notch 4 may thereafter, if desired, be readily provided with minor corrections by experiment. We have found the following values for the dimensions of the plate 3 suitable for wave lengths of several centimeters or thereabouts when the plate 3 is made of polystyrene. The dimensions are given in terms which represent the free-space wave-length, which of course will be different from the wave length in the guide 2.

*Table*

| | |
|---|---|
| Inner diameter of cylindrical wave guide | 0.74λ |
| Thickness of plate **3** | 0.10λ |
| Depth of notches **4** | 0.28λ |
| Width of notches **4** | 0.22λ |

For a plate 3 adapted to produce a circularly polarized wave in the guide 2 when originally excited with a plane-polarized wave of 45° incidence, as above set forth, the axial length (including the length of the notches 4) should, for the other dimensions given in the table, be equal to 1.51λ.

The plate 3 may be made to produce a 180° phase difference between the component having the electric vector *b* and the component having the electric vector *c*, with the result that the transmitted wave will again be plane-polarized but will have its plane of polarization shifted by an angle equal to twice the angle between the direction of the electric vector of the incident wave and the direction of the plate 3. Such a plate, in the case where the other dimensions are given by the table, have been found to operate satisfactorily when the axial length, including the length of the notches 4 is 2.74λ.

Fig. 2 shows another method for converting waves of plane polarization into elliptically or circularly polarized waves and vice versa. In this case a clamp 5 is brought to bear upon the pipe 2 so as to deform the pipe to give it an elliptical cross section. If the incident radiation is again represented by the arrows *a* the components represented by the arrows *b* and *c* will have different velocities of propagation and different wavelengths in that part of the pipe 2 which has an elliptical cross section as shown, because of the dependence of the wave length and velocity of propagation of waves of the mode here in question upon the width of the pipe in the transverse direction perpendicular to the direction of the electric vector, which width is different for the components *b* and *c* respectively. The clamp 5 may be provided to exert a clamping action over a substantial length of pipe, or a number of clamps may be employed, as illustrated, for instance, in Fig. 6. If desired, the pipe may be permanently deformed instead of constrained by clamps. The provision of clamps makes the deformation adjustable, however. The problem of reflection at the transition between circular and elliptical cross section is not serious in the arrangement of Fig. 2 because the natural resilience of the pipe may be relied on to provide a smooth taper between the portions of circular cross section and the portions of elliptical cross section. If the taper is sufficiently long, a condition not usually difficult to realize in practice provided the requirements regarding reflections are not too exacting, the reflections caused by the transition will for practical purposes neutralize each other.

Figs. 3 and 4 show a form of apparatus of the general type shown in Fig. 1 with an additional provision of a second plate of dielectric material 7, which is adapted to provide a fine adjustment for the apparatus. The plate 3 is preferably provided with approximately the same dimensions as those preferred in the case of Fig. 1. Consequently for wave lengths in the neighborhood of three centimeters the thickness of the plate 3 might be about ⅛ inch. The plate 7 is made much thinner and because of this fact it need not be provided with notches corresponding to the notches 4, and may instead be rectangular in form as shown in Fig. 4. For a wave length of about three centimeters the thickness of the plate 7 may be about $\frac{1}{32}$ inch. The desired effect to be produced by the combined action of the plates 3 and 7 may then be controlled by varying the angular position of the plate 7. When the plate 7 is at right angles to the plate 3 it acts in opposition to the plate 3, while when the plate 7 is parallel to the plate 3 its effect is directly added to the effect of the plate 3.

Fig. 5 shows the organization of an arrangement such as that shown in Fig. 1 into a system for transmitting and receiving radio waves. A transmitter located at 10 is coupled to a rectangular wave guide 11 which feeds through a suitable taper section of wave guide 12 into a cylindrical wave guide 13. A dielectric plate 14, arranged in the manner described in Fig. 1 and located in the cylindrical wave guide 13, serves to convert the plane-polarized waves excited by the transmitter 10 into circularly polarized waves. The circularly polarized waves are then radiated by means not shown, which may be a form of radiator-interceptor or antenna shown in Fig. 8 and described below. The resulting radiation may then be reflected by objects in the path of such radiation and the reflected radiation will likewise be circularly polarized since the reflection introduces only a change in phase. The reflected echo may then be intercepted by the radiator-interceptor, thus causing circularly polarized waves to travel to the left in the wave guide 13 of Fig. 5. The said waves are, by the action of the plate 14, converted into plane-polarized waves but the resulting plane-polarized waves are polarized in a plane at right angles to the plane of polarization of the waves in the rectangular wave guide 11. This effect results from the fact that the waves have now passed twice through quarter-wave plate 14 so that the result is the same as if they had passed through a half-wave plate. The plate 14, as pointed out in connection with Fig. 1, should have its faces at an angle of 45° to the plane of polarization of the wave in the wave guide 11.

Because of the direction of its polarization, the received signal after passing through the plate 14 cannot be accepted by the wave guide 11, but proceeds instead into the rectangular wave guide 15, which is oriented so as to accept waves polarized in the direction of polarization of the received signal and to reject waves polarized in the manner of those produced in their wave guide 11 by the transmitter 10. The wave guide 15 leads to a receiver 16 which is operated by the received signal to provide information concerning the location of the objects producing the echo of the transmitted signal. The orientation of the rectangular wave guide 15 thus serves to protect the receiver against damage from overload which might otherwise result from the operation of the transmitter 10. For some types of apparatus no other overload protection will be necessary.

Fig. 6 shows a form of radio transmission and reception system having a mode of operation generally similar to that of the system shown in Fig. 5 but employing a protective breakdown discharge device for additional protection of the receiver 16. The conversion of plane-polarized waves into circularly polarized waves is accomplished, in the particular example illustrated, by the method shown in Fig. 2 instead of by the method illustrated in Fig. 1. The clamps 5 and 5*a* operate in the manner indicated in Fig. 2 to deform the wave guide 2 into an elliptical pipe for a suitable distance. The amount of deformation and the distance between the clamps 5 and 5*a* is so coordinated that the components *b* and *c* (referring to Fig. 2) of the plane-polarized wave *a* are given a relative phase shift of 90° by passing through the "squeeze section."

The pipe 17 which forms a junction with the pipe 2 between the clamp 5 and the taper section 12 is a cylindrical pipe of the same as the pipe 2 and leads through joints 18 and 19 and a protective diaphragm 20, to a taper section 21 which feeds a rectangular wave guide 22, which is oriented at right angles to the rectangular wave guide 11 in such a manner as to accept waves at a polarity at right angles to that of the wave which the wave guide 11 is adapted to transmit. Although the difference in polarization at the junction of the pipes 2 and 17 between the transmitted and received signals would be adequate to protect even a sensitive receiver in a perfectly matched system, the possibility of part of the transmitted signal being reflected in some part of the system between the circular-polarizing element and the antenna or radiator makes it desirable to provide additional protection to the receiver, because such reflections would give rise to waves in the pipe 17 of a polarization appropriate for reaching the receiver 16 through the wave guide 22. It is very difficult to construct an antenna system which is so well matched to the rest of the system and to the surrounding space that substantial internal reflections do not occur.

It requires only a relatively small reflection within the system to produce a disturbance at the receiver input having many times the amplitude of the usual received signal. For this reason the protective diaphragm 20 is provided in the arrangement of Fig. 6. The protective diaphragm 20 is shown in elevation in Fig. 7 which is a cross section along the line 7—7 of Fig. 6, looking downwards at the location 7—7. The diaphragm 20, as shown, comprises a partition across the pipe wave guide 17, closing off said wave guide except for a cross-shaped aperture which may be regarded as made up of crossed slits, each slit being in the shape of a dumbbell. The slits are designed so that each will be resonant at the frequency of operation. Because of the relative perpendicularity of the slits and because of their orientation parallel to the sides of the rectangular wave guides 11 and 22, one of the slits is adapted to be excited by waves of the polarization of those transmitted by the wave guide 11 and another of the slits is adapted to be excited by waves of the polarization of those which the wave guide 22 is adapted to transmit. In consequence, when the transmitter 10 is energized, the slit adapted to be excited by the wave of the polarization which the wave guide 11 is adapted to transmit will be excited and a breakdown will take place across it, the breakdown being concentrated towards the center of the diaphragm 20 because of the higher voltages occurring near the center portion of the slit. The said breakdown will detune the slit which is not excited by the waves in the wave guide 11 and provide ionization in the neighborhood of the center of said slit, so that waves reflected at places in the system between the clamp 5a and the antenna and having a polarization, when they reach the wave guide 17, adapted for transmission in the wave guide 22 will be substantially stopped by the diaphragm and prevented from reaching the receiver 16 in sufficient intensity to cause damage thereto. When the transmitter 10 is not in operation an echo is received by the antenna of this system, there will be no breakdown at any part of the diaphragm 20 and the slit aligned with the wave guide 22 will permit the received signal to proceed to the wave guide 22 and the receiver 16 with little, if any attenuation. The diaphragm 20 should be located at approximately a half-wave length from the junction of the guides 17 and 2 so as to produce a minimum of interference with the transmission of energy along the guide 2 during transmitter operation when a discharge detunes the slits of the diaphragm.

Fig. 8 shows a form of radiator-interceptor or antenna suitable for use with systems such as Figs. 5 and 6 which transmit and receive circularly polarized radiation. For some purposes it may be sufficient for radiation and interception of circularly polarized waves to provide simply an open termination of the wave guide 2 without any additional apparatus except possibly an iris diaphragm near the end of the wave guide 2 for improving the impedance match. In order that a concentrated beam may be emitted and in order that reception of the echoes may be directionally sensitive, thus eliminating interference from other directions, a radiating and intercepting system such as that shown in Fig. 8 may, however, be advantageous. In Fig. 8 is shown a cylindrical wave guide 24, which may be an extension of the wave guide 2 or may be a wave guide connected to the wave guide 2 through suitable bends and rotating joints. The wave guide 24 is open at its right hand extremity. A parabolic reflector 25 is mounted upon the wave guide 24 coaxially therewith and with its focus situated a small distance in front of the open end of the wave guide 24. A reflecting metallic plate 26 is located also a small distance in front of the open end of the wave guide 24, preferably at a distance somewhat more than a quarter-wave length, which may be as much as a half-wave length. The reflecting plate 26, which may take the form of a disk, is held in place by means not shown, made of insulating material such as polystyrene and mounted on the end of the pipe 24.

Another suitable form of radiating and intercepting system might be simply a parabolic reflector, such as the reflector 25, fed at its focus by the open end of a cylindrical wave guide facing toward the vertex of the parabolic reflector. Such a system, however, is subject to difficulties when it is desired to provide for rotation of rapid alteration of the orientation of the system because of the difficulty of mechanically rotating the feed wave guide as well as the parabolic reflector.

Figure 9:
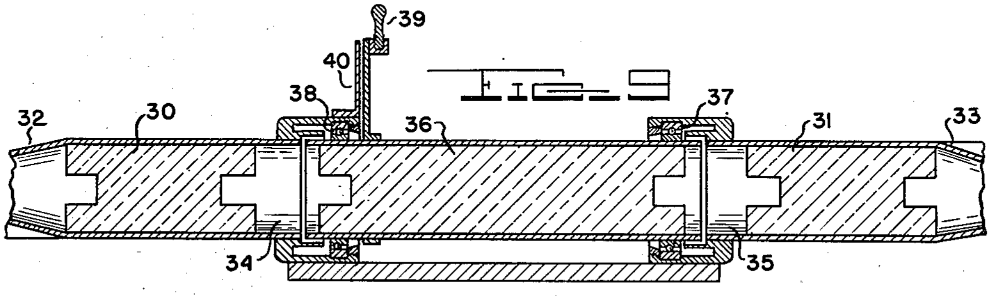
Fig. 9 shows, in cross section, a phase-shifter or electrical-length-adjuster for use with guided plane-polarized waves.

Fig. 9 shows a form of apparatus for shifting the phase of plane-polarized waves. Since a shift in the phase of a guided wave corresponds to the effect of a change in the length of the wave guide, such an apparatus may be termed a "line stretcher," although the physical length of the wave guide is not varied and only its electrical length is altered. The dielectric plates 30 and 31 are of the type shown in Fig. 1 and serve to convert plane-polarized waves to circularly polarized waves in one direction and in the other direction to convert circularly polarized waves into plane-polarized waves. The waves in the tapered sections of wave guides 32 and 33 may then be of the plane-polarized type while the waves in the cylindrical portions of wave guides 34 and 35 are of the circularly polarized type. The dielectric plate 36 is of the same general type as the dielectric plates 30 and 31 except that it is of such length as to provide approximately 180 degrees relative phase shift between the components respectively perpendicular and parallel to its faces. Such a plate is adapted to shift the phase of circularly polarized radiation and the phase shift produced will vary with the angular position of the plate 36. As the dielectric plate 36 is rotated through one revolution, the phase of the waves in the wave guide 33 with respect to the waves in the wave guide 32 changes by two wave lengths. Ball bearing joints 37 and 38, an actuating handle 39 and a scale 40 are provided for the adjustment of the angular position of the plate 36 to a desired value.

Figure 10:
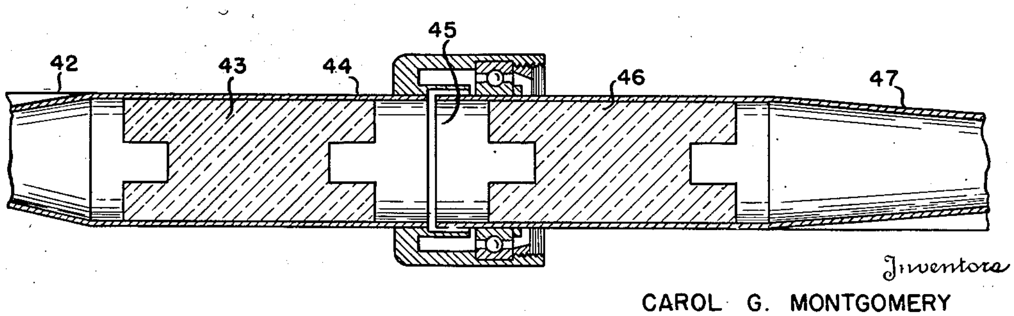
Fig. 10 shows, also in cross section, a rotating joint according to the present invention for a wave guide system.

Fig. 10 shows an arrangement designed to function as a rotating joint. In this apparatus plane-polarized waves may be provided in the wave guide 42 which are transformed into circularly polarized waves by the dielectric plate 43 located in the cylindrical wave guide 44. The circularly polarized waves then pass beyond the rotating joint 45 and, because of its axial symmetry, are not affected by the position of said joint nor by the orientation of the dielectric plate 46 which then transforms the waves back to a plane-polarized type of wave which is thereafter propagated along the wave guide 47. The apparatus may be used for transmitting energy in either direction. It is to be understood that in this apparatus the plates 43 and 46, just as the plates 30 and 31 in Fig. 9, should be at approximately 45° to the direction of the plane of polarization which the corresponding wave guides 42 and 47 are adapted to transmit. The wave guides 42 and 47 are shown as tapered sections, leading to rectangular wave guides which are not shown.

Fig. 11 shows a form of apparatus for adjusting the plane of polarization of plane-polarized waves in a cylindrical wave guide. This apparatus may be used to correct the polarization caused by bends or other asymmetrical features of a cylindrical wave guide system. The apparatus consists essentially of a dielectric plate 50 mounted in an axially rotatable section 51 of cylindrical wave guide. The plate 50, like the plate 36 of Fig. 9, is adapted to provide 180° relative phase shift between the components of incident radiation oriented respectively parallel and perpendicular to the faces of the plate 50. The plate 50 therefore has the effect of rotating the plane of polarization of the incident wave through an angle equal to twice the angle between the said plane of polarization and the orientation of the plate 50. In the arrangement shown in Fig. 11 rotation is accomplished by means of a knob 52 acting on a worm 53 adapted to drive a segmental crown gear 54, whereby the plane of polarization may be adjusted with a considerable degree of precision.

An important limitation on the use of various types of apparatus herein described lies in the fact that dielectric plates such as the plate 3 of Fig. 1 are generally quite sensitive to frequency. For instance the plate 3 of Fig. 1 may have a length in a typical case slightly larger than the wave length of the $H_1$ mode of oscillation in the empty portion cylindrical wave guide 2. Consequently the transition from plane-polarized to circularly polarized waves will be substantially complete only for a relatively narrow range of frequencies, and for other frequencies in the neighborhood of the design frequency the result will be more or less elliptical polarization. In the case of the apparatus of Fig. 10 such failure to obtain substantially circular polarization will result in the apparatus of Fig. 10 being sensitive to the position of the rotating joint 45, so that the apparatus of Fig. 10 can be expected to operate satisfactorily only for a relatively narrow range of frequencies.

In order to make apparatus according to the present invention operate satisfactorily over the widest possible frequency band it may be desirable to provide the plate 3 or some equivalent structure in a form providing the largest possible relative phase shift per unit axial length between the two components of the incident radiation. The increase of the relative phase shift per unit axial length between the components may be expected to be limited in practice because of the possibility of permitting modes other than the desired mode of oscillation for one or the other of the components in question. This limit may be avoided to some extent working with wave guide dimensions closer to the critical dimensions for transmission of the frequency in question, but if this is done frequency-sensitivity may yet fail to be avoided, for in order to maintain the desired high relative phase shift between the components of the waves, it may be necessary to work so close to the said critical dimensions as to introduce an increase of frequency-sensitivity and to increase excessively the attenuation of one component, as well as to introduce the necessity for considerable precision in the dimensions of the wave guides and the configuration of the wave guide cross section and precautions against thermal expansion effects and the like. Dielectric plates corresponding in sections to the plate 3 of Fig. 1 may be used which have a cross-sectional shape other than the rectangular cross section of the plate of Fig. 1. Various shapes may be devised in order to obtain a maximum effect upon the wave length of one component and a minimum effect upon the wave length of the other component polarized at right angles to the first component. If desired, instead of polystyrene, materials of higher dielectric constants, such as "Mycalex" or even rutile may be used for the dielectric plate 3.

What we desire to claim and obtain by Letters Patent is:

1. Apparatus for the control of the polarization of waves in a wave guide system comprising, a length of substantially cylindrical wave guide, and a plate of dielectric material disposed axially of said length of wave guide in a diametral plane thereof, said plate being of a width equal to the internal diameter of said wave guide and of a thickness substantially less than the width, said plate of dielectric providing a large wave length modification to the component of the incident waves which is parallel to the plane of said plate and a relatively small wave length modification to a component of the incident waves oriented perpendicularly to the plane of said plate.

2. Apparatus for the control of the polarization of waves in a wave guide system comprising a length of substantially cylindrical wave guide, and a plate of dielectric material disposed axially of said length of wave guide in a diametral plane thereof, said plate being of a width equal to the internal diameter of said wave guide and of a thickness substantially less than the width, said plate having notches in the axial extremities thereof of a depth of approximately one-quarter of the mean wave length of oscillations desired to be transmitted in said guide, said notches providing an approximate impedance match between the portions of said guide respectively occupied and unoccupied by said plate.

3. Apparatus for the control of the polarization of waves in a wave guide system comprising a length of substantially cylindrical wave guide, and a plate of dielectric material disposed axially of said length of wave guide in a diametral plane thereof, said plate being of a width equal to the internal diameter of said wave guide and of a thickness of approximately one-tenth of the mean wave length of oscillations desired to be transmitted in said guide, said plate of dielectric providing a large wave length modification to the component of the incident waves which is parallel to the plane of said plate and a relatively small wave length modification to a component of the incident waves oriented perpendicularly to the plane of said plate, said plate having rectangular notches in the axial extremities thereof of width and depth of approximately one-quarter of the mean wave length of oscillations desired to be transmitted in said guide, said notches providing an approximate impedance match between the portions of said guide respectively occupied and unoccupied by said plate.

4. Apparatus for producing a circularly polarized wave in a wave guide which is excited with a plane-polarized wave, said apparatus comprising, a length of substantially cylindrical wave guide, and a plate of dielectric material disposed axially of said length of wave guide in a diametral plane oriented at an angle of 45 degrees to the direction of said plane polarized wave, said plate being of a width equal to the internal diameter of said wave guide and of a thickness of approximately one-tenth of the mean wave length of oscillations desired to be transmitted in said guide, and of a length of approximately one and one-half times the mean wave length of oscillations desired to be transmitted in said guide.

5. Apparatus in accordance with claim 4 in which said dielectric plate has substantially rectangular notches in the axial extremities thereof of width and depth of approximately one-quarter of the mean wave length of oscillations desired to be transmitted in said guide, said notches providing an approximate impedance match between the portions of said guide respectively occupied and unoccupied by said plate.

6. Apparatus for shifting the plane of polarization in a wave guide which is excited with a plane polarized wave, said apparatus comprising, a length of substantially cylindrical wave guide and a plate of dielectric material disposed axially within said wave guide at an angle to the direction of the exciting plane-polarized wave, said plate being of a width equal to the internal diameter of said wave guide and of a thickness of approximately one-tenth of the mean wave length of oscillations desired to be transmitted in said guide, and of a length of approximately two and three-quarter times the mean wave length of oscillations desired to be transmitted in said guide, said plate of dielectric causing a shift in the plane of polarization by an angle equal to twice the aforesaid angle.

7. Apparatus in accordance with claim 6 in which said dielectric plate has rectangular notches in the axial extremities thereof of width and depth of approximately one-quarter of the mean wave length of oscillations desired to be transmitted in said guide, said notches providing an approximate impedance match between the portions of said guide respectively occupied and unoccupied by said plate.

8. Apparatus in accordance with claim 6 wherein said section of cylindrical wave guide having said plate of dielectric disposed therein is axially rotatable relative to said system.

9. Apparatus for varying the phase of waves in a wave guide system comprising, first and second lengths of substantially cylindrical wave guide each having a plate of dielectric material disposed axially therein in a diametral plane thereof, and a third length of substantially cylindrical wave guide being disposed between said first and second sections and being relatively rotatable therewith, each of said plates in said first and second sections being of a length of approximately one and one-half times the mean wave length of oscillations desired to be transmitted in said wave guide system for converting plane-polarized incident waves into circularly polarized waves and for converting circularly polarized waves into plane-polarized waves, and a third plate of dielectric material disposed axially within said third length of wave guide in a diametral plane thereof, said third plate being of a length of approximately two and three-fourths times the mean wave length of oscillations desired to be transmitted in said guide for producing approximately 180° relative phase shift between mutually perpendicular polarized components of said circularly polarized waves.

10. Apparatus in accordance with claim 9 in which said first, second and third dielectric plates each have substantially rectangular notches in the axial extremities thereof of width and depth of approximately one quarter of the mean wave length of oscillations desired to be transmitted in said guide.

11. A rotating joint for a wave guide system comprising first and second lengths of substantially cylindrical wave guide disposed in axially juxtaposition, means connected to said first and second lengths providing relative axial rotation therebetween, and first and second plates of dielectric material respectively disposed axially within said first and second lengths, each of said plates being of a width equal to the internal diameter of said wave guide lengths and of a thickness approximately one-tenth of the mean wave length of oscillations desired to be transmitted in said guide, and of a length of approximately one and one-half times the mean wave length of oscillations desired to be transmitted in said guide, said first and second plates respectively converting incident plane-polarized waves into circularly polarized waves and converting circularly polarized waves into plane-polarized waves.

12. Apparatus in accordance with claim 11 wherein said first and second dielectric plates have substantially rectangular notches in the axial extremities thereof of width and depth of approximately one-quarter of the mean wave length of oscillations desired to be transmitted in said guide.

E. M. PURCELL.
CAROL G. MONTGOMERY.
DOROTHY DURFEE MONTGOMERY.

REFERENCES CITED

The following references are of record in the file of this patent:

UNITED STATES PATENTS

| Number | Name | Date |
|---|---|---|
| 2,197,123 | King | Apr. 16, 1940 |
| 2,235,010 | Chaffee | Mar. 18, 1941 |
| 2,403,289 | Korman | July 2, 1946 |
| 2,407,318 | Mieher | Sept. 10, 1946 |
| 2,425,345 | Ring | Aug. 12, 1947 |
| 2,433,368 | Johnson | Dec. 30, 1947 |
| 2,438,119 | Fox | Mar. 23, 1948 |

FOREIGN PATENTS

| Number | Country | Date |
|---|---|---|
| 108,349 | Australia | Aug. 22, 1939 |